United States Patent [19]

Hancock et al.

[11] Patent Number: 4,774,527

[45] Date of Patent: Sep. 27, 1988

[54] PRINTHEAD HAVING ELECTRODES AT MORE THAN ONE EDGE SURFACE

[75] Inventors: Tony A. Hancock, Lexington, Ky.; Richard A. John, Yorktown Heights, N.Y.; Ramon Lane, Crompond, N.Y.; Omesh Sahni, Yorktown Heights, N.Y.; James T. Welch, III, Lexington, Ky.

[73] Assignee: International Business Machines Corporation, Armonk, N.Y.

[21] Appl. No.: 1,072

[22] Filed: Jan. 7, 1987

[51] Int. Cl.[4] ...................... G01D 15/10; G01D 15/16; B41J 3/20; H01R 23/68

[52] U.S. Cl. ........................... 346/76 PH; 346/139 C; 400/120; 361/198; 361/413

[58] Field of Search ...................... 346/139 C, 76 PH; 400/120; 361/198, 413

[56] References Cited

U.S. PATENT DOCUMENTS

| | | | |
|---|---|---|---|
| 4,287,525 | 9/1981 | Tagawa | 346/139 C |
| 4,390,884 | 6/1983 | Applegate | 346/139 C |
| 4,621,305 | 11/1986 | Daum | 361/413 |
| 4,626,870 | 12/1986 | Yamamoto | 346/76 PH |

OTHER PUBLICATIONS

IBM Technical Disclosure Bulletin, vol. 28, No. 9, Feb. 1986, p. 3842.

IBM Technical Disclosure Bulletin, vol. 17, No. 2, Jul. 1974, p. 400 (Vesci).

*Primary Examiner*—Joseph W. Hartary

*Assistant Examiner*—Mark Reinhart

*Attorney, Agent, or Firm*—Frank C. Leach, Jr.; John A. Brady

[57] ABSTRACT

A printhead of a resistive ribbon printer has a column of electrodes formed on each of at least two edge surfaces. When the column of electrodes at one edge surface is worn out after being used for printing, the printhead is rotated so that the column of electrodes at the other edge surface is used for printing. Instead of the column of electrodes at each edge surface being the same size, the column of electrodes at one edge surface could be smaller than at the other edge surface so as to have a higher resolution for graphics whereby the position of the printhead is changed each time that higher resolution is desired and then returned to its initial position when alphanumeric printing is to occur. The printhead could have more than two edge surfaces with each having a column of electrodes for printing when at the printing position.

13 Claims, 5 Drawing Sheets

PRINTHEAD HAVING ELECTRODES AT MORE THAN ONE EDGE SURFACE

FIELD OF THE INVENTION

This invention relates to a printhead for a thermal printer and, more particularly, to a printhead having a column of electrodes at more than one edge surface for use at different times for printing.

BACKGROUND OF THE INVENTION

A printhead utilized with a resistive ribbon in a printer, which includes a typewriter, has a plurality of electrodes arranged in a column with selected electrodes in the column being energized to produce printing through the selected electrodes being heated to soften the ink of a resistive ribbon to a flowable state. Each of U.S. Pat. Nos. 4,390,884 to Applegate et al and 4,575,731 to Horlander discloses such a resistive ribbon printhead.

In each of the aforesaid Applegate et al and Horlander patents, the electrodes are arranged in a column at an edge surface of the printhead. Wear of the electrodes during printing requires periodic replacement of the printhead. This is easily accomplished through releasing a spring clip holding the printhead as shown and described in the aforesaid Applegate et al patent, for example.

SUMMARY OF THE INVENTION

The printhead of the present invention substantially increases the life of a resistive ribbon printhead through disposing a column of electrodes at each of at least two separate edge surfaces of the printhead. The columns of electrodes are connected to the same electrical conductive means so that utilization of any column of electrodes at the printing position produces the same printing in response to the same electrical signals supplied over the electrical conductive means. Thus, by changing the position of the printhead, a different column of electrodes is disposed at the printing position. Therefore, the life of a printhead can be at least doubled through the use of the printhead of the present invention in comparison with the previously available printheads having only one column of electrodes and at only a slightly greater cost so as to substantially reduce the overall cost.

In addition to the printhead being capable of having at least two columns of electrodes at each of two edge surfaces of the printhead, the printhead could be designed to have each column of electrodes of a different size. This would allow the same printhead to be used for printing graphics, which require a higher resolution and smaller size electrodes, and for printing alphanumeric characters. Accordingly, the printhead of the present invention may be employed to not only increase the life of a resistive ribbon printhead but also could be utilized to have columns of electrodes of different sizes on the same printhead.

An object of this invention is to provide a printhead having a plurality of columns of electrodes for use at a printing position at different times.

Another object of this invention is to provide a longer life printhead for a thermal printer.

The foregoing and other objects, features, and advantages of the invention will be apparent from the following more particular description of the preferred embodiments of the invention as illustrated in the accompanying drawings.

DETAILED DESCRIPTION

Figure 1:
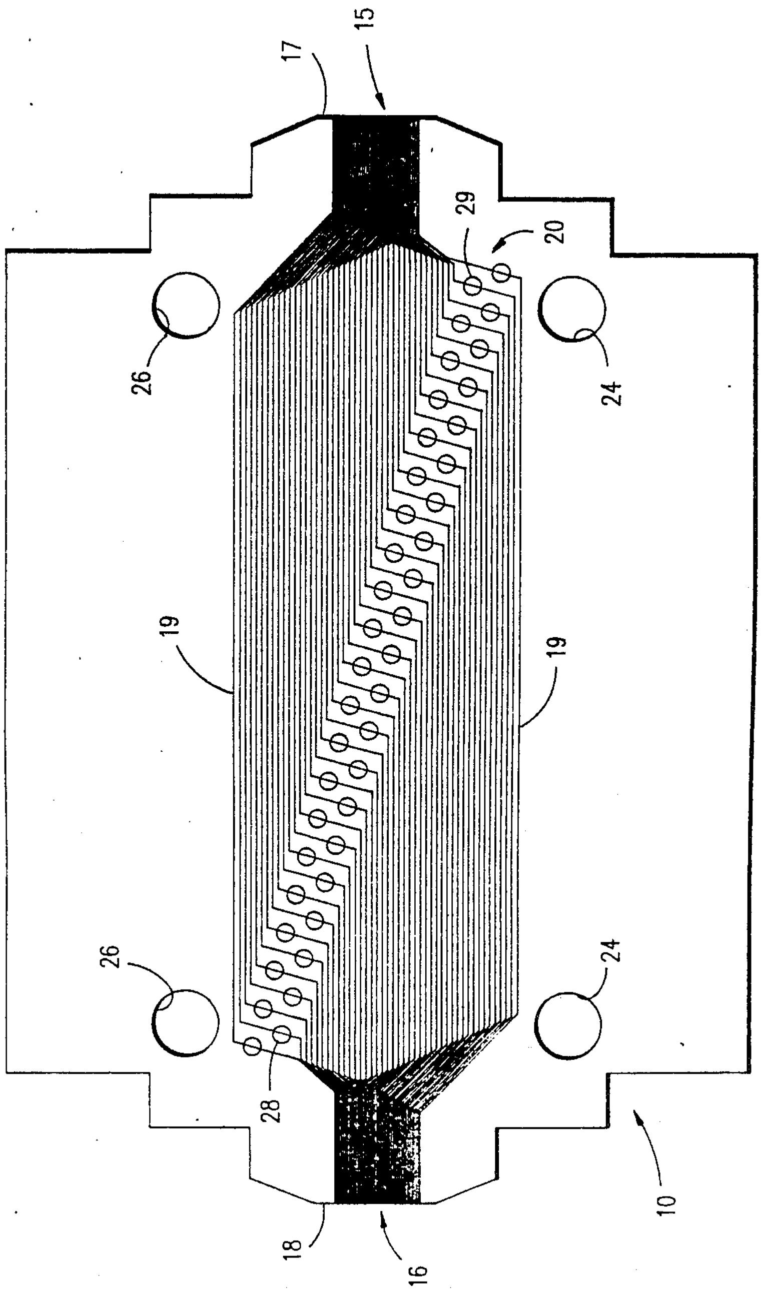
FIG. 1 is an enlarged plan view of a resistive ribbon printhead of the present invention having two columns of electrodes at two edge surfaces and showing an arrangement of the electrodes and the electrical conductive means therebetween.
Figure 4:
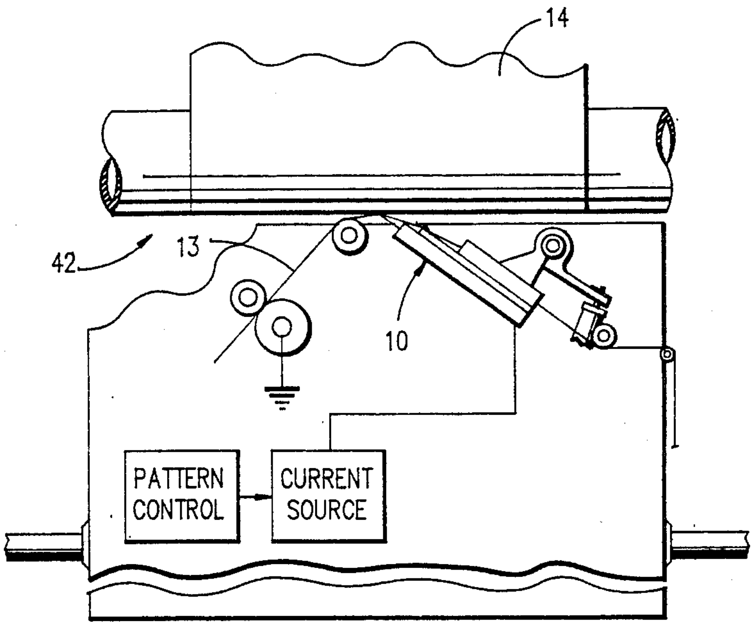
FIG. 4 is a fragmentary top plan view of a portion of a thermal printer including the printhead of FIG. 1 and showing a ribbon and a column of electrodes cooperating therewith.

Referring to the drawings and particularly FIG. 1, there is shown a printhead 10 of the present invention for use in a thermal printer 12 (see FIG. 4). One example of the thermal printer 12 is more particularly shown and described in U.S. Pat. No. 4,545,693 to Bartlett et al and incorporated by reference herein.

The thermal printer 12 includes a thermal transfer medium 13 having marking material transferred to a recording medium 14 when the marking material of the transfer medium 13 is softened to a flowable state by heat. The heat is supplied from a first set 15 (see FIG. 1) of electrodes or a second set 16 of electrodes of the printhead 10.

The first set 15 of electrodes is arranged in a column at a first edge surface 17 of the printhead 10. The second set 16 of electrodes is arranged in a column at a second edge surface 18, which is substantially parallel to the first edge surface 17, of the printhead 10.

The mounting of the printhead 10 on the thermal printer 12 (see FIG. 4) determines whether the first set 15 (see FIG. 1) of electrodes or the second set 16 of electrodes is used to print. The first set 15 of electrodes is deemed to be at the printing position in FIG. 1.

Each of the first set 15 of electrodes is connected through a separate electrical conductor 19 to one of a plurality of symmetrically arranged, electrical contact pads 20. Each of the second set 16 of electrodes is connected through one of the conductors 19 to one of the contact pads 20.

Thus, the number of the conductors 19 is equal to the number of electrodes in each of the first set 15 of electrodes and the second set 16 of electrodes. The number of the contact pads 20 is the same as the number of the conductors 19.

While the conductors 19 are shown as crossing the contact pads 20 so as to be continuous between an electrode of the first set 15 of electrodes and an electrode of the second set 16 of electrodes, it should be understood that each of the conductors 19 could be formed of two parts with one extending from each of the contact pads 20 to an electrode of the first set 15 of electrodes and the other extending from the same contact pad 20 to an electrode of the second set 16 of electrodes. However, this would still constitute a separate electrical conductor between an electrode of the first set 15 of electrodes and an electrode of the second set 16 of electrodes.

The first set of electrodes includes a plurality of electrodes such as forty-two, for example, arranged in a column with its upper and lower electrodes preferably being sensing electrodes in the manner more particularly shown and described in the aforesaid Horlander patent. The second set 16 of electrodes includes the same number of electrodes as the first set 15 of electrodes with the electrodes arranged in a column with its upper and lower electrodes preferably being sensing electrodes in the manner more particularly shown and described in the aforesaid Horlander patent.

When the printhead 10 is mounted on the thermal printer 12 (see FIG. 4) so as to be held in position for printing such as by a spring clip in the manner shown and described in the aforesaid Applegate et al patent, for example, each of the contact pads 20 (see FIG. 1) engages one of a plurality of contact pads 21 (see FIG. 2) of a flattened cable 22. Each of the contact pads 21, which are symmetrically arranged in a pattern corresponding to that of the contact pads 20 (see FIG. 1), is connected to an electrical conductor 23 (see FIG. 2) of the cable 22. The conductors 23 are connected to a printed circuit board (not shown) in the thermal printer 12 (see FIG. 4) to receive electrical signals for selectively energizing electrodes in the first set 15 (see FIG. 1) of electrodes and the second set 16 of electrodes. The number of the contact pads 21 (see FIG. 2) is equal to the number of the contact pads 20 (see FIG. 1).

When the printhead 10 is positioned for cooperation with the cable 22 (see FIG. 2) so that the first set 15 (see FIG. 1) of electrodes is to be utilized for printing and this is the position shown in FIG. 1 as previously mentioned, the printhead 10 has a pair of alignment holes 24 aligned with a pair of alignment holes 25 (see FIG. 2) in the flattened cable 22. The printhead 10 (see FIG. 1) is held in this position by a suitable spring clip in a manner similar to that shown and described in the aforesaid Applegate et al patent whereby alignment pins (not shown) extend through the alignment holes 24 in the printhead 10 and the alignment holes 25 (see FIG. 2) in the cable 22.

When the second set 16 (see FIG. 1) of electrodes is to be employed for printing, the printhead 10 is rotated 180° to position the second set 16 of electrodes at the printing position so that a pair of alignment holes 26 in the printhead 10 is aligned with the pair of the alignment holes 25 (see FIG. 2) in the cable 22. The printhead 10 (see FIG. 1) is then retained on the printer 12 (see FIG. 4) in the same manner as when the first set 15 (see FIG. 1) of electrodes is utilized for printing.

Thus, each of the contact pads 21 (see FIG. 2) of the cable 22 is arranged to always engage the contact pad 20 (see FIG. 1) for an electrode at a specific printing position irrespective of whether the first set 15 of electrodes or the second set 16 of electrodes is being utilized for printing. For example, a contact pad 27 (see FIG. 2) of the contact pads 21 will engage the second from the top of the electrodes in the printing position irrespective of whether the first set 15 (see FIG. 1) of electrodes or the second set 16 of electrodes is at the printing position. That is, the contact pad 27 (see FIG. 2) of the contact pads 21 will engage a contact pad 28 (see FIG. 1) of the contact pads 20 when the first set 15 of electrodes is at the printing position and will engage a contact pad 29 of the contact pads 20 when the second set 16 of electrodes is at the printing position. As shown in FIG. 1, the contact pad 28 is in engagement with the electrode second from the top when the first set 15 of electrodes is employed for printing, and the contact pad 29 is in engagement with the electrode second from the top when the second set 16 of electrodes is used to print.

Figure 3:
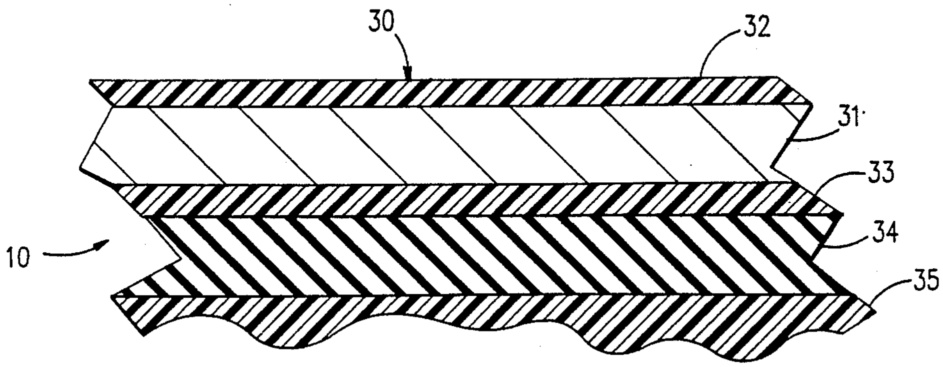
FIG. 3 is an enlarged fragmentary sectional view of a portion of the printhead of FIG. 1.

As shown in FIG. 3, the printhead 10 comprises a body 30 including a tungsten substrate 31, which is etched to form the first set 15 (see FIG. 1) of electrodes, the second set 16 of electrodes, the conductors 19, and the contact pads 20. The tungsten substrate 31 (see FIG. 3) has films 32 and 33 of polyimide adhered to each of its substantially parallel surfaces by a suitable adhesive. The film 33 of polyimide has a layer 34 of silicone rubber laminated thereto. A housing 35 of a plastic material such as polyphenylene sulfide sold under the trademark RYTON, for example, is laminated to the layer 34 of silicone rubber.

Portions of the film 32 of polyimide are removed by grinding to expose portions of the tungsten substrate 31 for use as the first set 15 (see FIG. 1) of electrodes and the second set 16 of electrodes. The film 32 (see FIG. 3) of polyimide is formed so as to not overlay the contact pads 20 (see FIG. 1).

Figure 5:
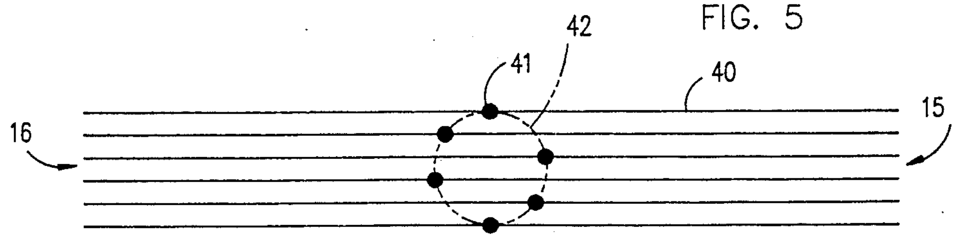
FIG. 5 is a schematic view showing another arrangement of the electrodes and the electrical conductive means therebetween.

Referring to FIG. 5, there is shown another symmetrical arrangement for connecting the first set 15 of electrodes and the second set 16 of electrodes to each other. In this arrangement, the first set 15 of electrodes has each of its electrodes connected by a separate electrical conductor 40 to one of a plurality of electrical contact pads 41, which are arranged on the circumference of a circle 42. The second set 16 of electrodes has each of its electrodes connected to one of the contact pads 41 through the same separate electrical conductor 40.

While the conductors 40 have been shown as being continuous between an electrode of the first set 15 of electrodes and an electrode of the second set 16 of electrodes, it should be understood that each of the conductors 40 could be formed of two parts with one extending from the contact pad 41 to an electrode of the first set 15 of electrodes and the other extending from the contact pad 41 to an electrode of the second set 16 of electrodes. However, this would still constitute a separate electrical conductor between an electrode of the first set 15 of electrodes and an electrode of the second set 16 of electrodes.

The cable 22 (see FIG. 2) has its electrical contact pads arranged in the same circular configuration as the contact pads 41 (see FIG. 5). With the printing position being that in which the first set 15 of electrodes is disposed as shown in FIG. 5, rotation through 180° disposes the second set 16 of electrodes at the printing position. This 180° of rotation causes the contact pad 41 at twelve o'clock in FIG. 5 to be rotated to six o'clock. This enables the same contact pad on the cable 22 (see FIG. 2) to be connected to the lowermost electrode of the second set 16 (see FIG. 5) of electrodes when the second set 16 of electrodes is at the printing position as was connected to the lowermost electrode of the first set 15 of electrodes when the first set 15 of electrodes was at the printing position. Thus, the same electrical signals are supplied to the same positioned electrode at the printing position for printing the same character irrespective of whether the first set 15 of electrodes or the second set 16 of electrodes is at the printing position.

While each of the first set 15 of electrodes and the second set 16 of electrodes has been shown in FIG. 5 with only six electrodes, this is for clarity purposes only. Thus, the first set 15 of electrodes would have forty-two electrodes, for example, as would the second set 16 of electrodes in the same manner as shown in FIG. 1. Therefore, the circumference of the circle 42 (see FIG. 5) would have each of the forty-two contact pads 41 spaced from the adjacent contact pads 41 by slightly more than 8°.

In the arrangement of FIG. 5, it is only necessary for the cable 22 (see FIG. 2) to have its contact pads arranged in the same circular configuration as the contact pads 41 (see FIG. 5). This would provide the desired symmetry irrespective of whether the first set 15 of electrodes or the second set 16 of electrodes is at the printing position.

Figure 6:
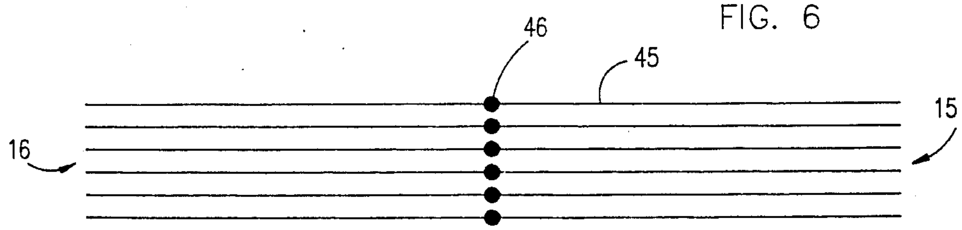
FIG. 6 is a schematic view showing a further arrangement of the electrodes and the electrical conductive means therebetween.

Referring to FIG. 6, each of the first set 15 of electrodes is connected through a separate electrical conductor 45 to one of a plurality of electrical contact pads 46 arranged linearly. Each of the second set 16 of electrodes also is connected to one of the contact pads 46 through one of the separate electrical conductors 45.

While the conductors 45 have been shown as being continuous between an electrode of the first set 15 of electrodes and an electrode of the second set 16 of electrodes, it should be understood that each of the conductors 45 could be formed of two parts with one extending from the contact pad 46 to an electrode of the first set 15 of electrodes and the other extending from the contact pad 46 to an electrode of the second set 16 of electrodes. However, it should be understood that this would still constitute a separate electrical conductor between an electrode of the first set 15 of electrodes and an electrode of the second set 16 of electrodes.

If the first set 15 of electrodes is at the printing position in FIG. 6, rotation of 180° positions the second set 16 of electrodes at the printing position. In this rotated position, the uppermost of the contact pads 46 has been moved to the lowermost position. As a result, the lowermost electrode of the second set 16 of electrodes is connected through the contact pad 46 to the same contact pad on the cable 22 (see FIG. 2) when at the printing position as was connected to the contact pad 46 (see FIG. 6) for the lowermost electrode of the first set 15 of electrodes when the first set 15 of electrodes was at the printing position. Thus, the same electrical signals are supplied to the same positioned electrode at the printing position for printing the same character irrespective of whether the first set 15 of electrodes or the second set 16 of electrodes is at the printing position.

The cable 22 (see FIG. 2) has its electrical contact pads arranged in the same linear arrangement as the contact pads 46 (see FIG. 6). Each of the contact pads on the cable 22 (see FIG. 2) has an electrical conductor leading therefrom to the printed circuit board (not shown) of the thermal printer 12 (see FIG. 4) in the same manner as the conductors 23 (see FIG. 2) extending from the contact pads 21.

While FIG. 6 discloses only six of the first set 15 of electrodes and six of the second set 16 of electrodes, this is for clarity purposes only. It should be understood that the first set 15 of electrodes would have forty-two electrodes, for example, and the second set 16 of electrodes would have forty-two electrodes, for example, in the same manner as shown in FIG. 1.

The arrangement of FIG. 6 requires a substantial amount of space since the contact pads 46 must be linearly spaced from each other. Thus, the diagonal arrangement of the contact pads 20 of FIG. 1 is preferred.

While the cable 22 (see FIG. 2) has only the contact pads 21 for cooperation with the contact pads 20 (see FIG. 1) of the printhead 10, it should be understood that the cable 22 (see FIG. 12) could have two separate sets of electrical contact pads 47A and 47B for engaging contact pads 47C (see FIG. 11), which are connected to the first set 15 of electrodes and the second set 16 of electrodes. When the first set 15 of electrodes is at the printing position, the first set of contact pads 47A (see FIG. 12) engages the contact pads 47C (see FIG. 11). The second set of contact pads 47B (see FIG. 12) engages the contact pads 47C (see FIG. 11) when the second set 16 of electrodes is at the printing position. These two sets of contact pads 47A (see FIG. 12) and 47B on the cable 22 would enable the non-symmetrical arrangement of the contact pads 47C (see FIG. 11) to be utilized.

Figure 14:
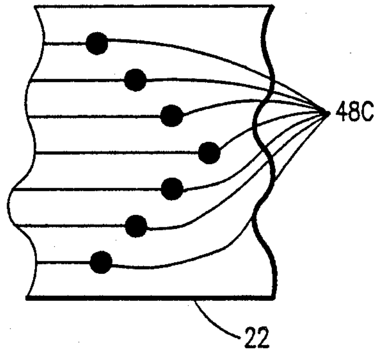
FIG. 14 is a schematic view of a portion of a cable for supplying electrical signals from a printer to the electrodes of FIG. 13.

Additionally, the printhead 10 could have the first set 15 (see FIG. 13) of electrodes connected to electrical contact pads 48A and the second set 16 of electrodes connected to separate electrical contact pads 48B. The cable 22 (see FIG. 14) would have a single set of electrical contact pads 48C for engaging the contact pads 48A (see FIG. 13) when the first set 15 of electrodes is at the printing position and for engaging the contact pads 48B when the second set 16 of electrodes is at the printing position.

Figure 11:
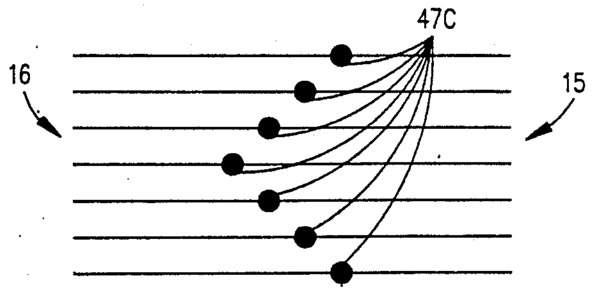
FIG. 11 is a schematic view showing a still further arrangement for the electrodes and the electrical conductive means therebetween.
Figure 12:
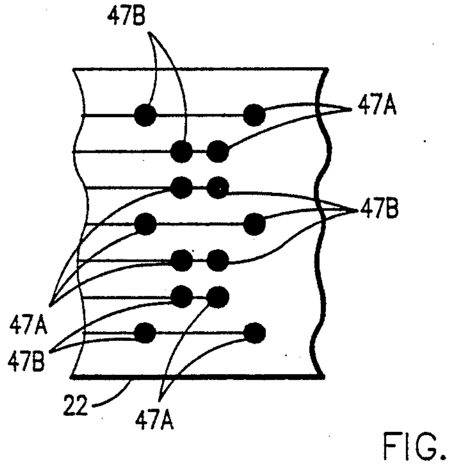
FIG. 12 is a schematic view of a portion of a cable for supplying electrical signals from a printer to the electrodes of FIG. 11.
Figure 13:
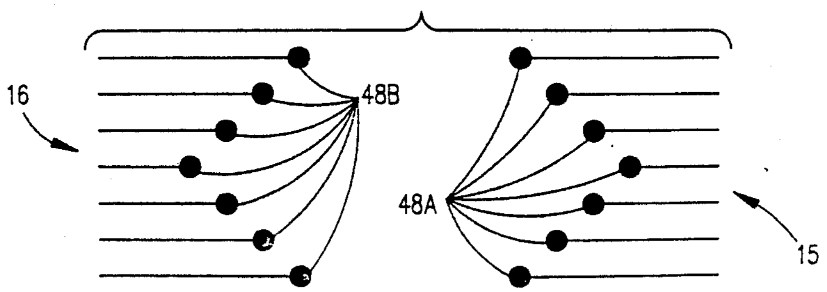
FIG. 13 is a schematic view showing yet another arrangement for the electrodes and the electrical conductive means therebetween.

While each of FIGS. 11 and 13 discloses each of the first set 15 of electrodes and the second set 16 of electrodes having only seven electrodes, this is for clarity purposes only. Thus, each of the first set 15 of electrodes and the second set 16 of electrodes would have forty-two electrodes, for example, in the same manner as shown in FIG. 1.

Figure 9:
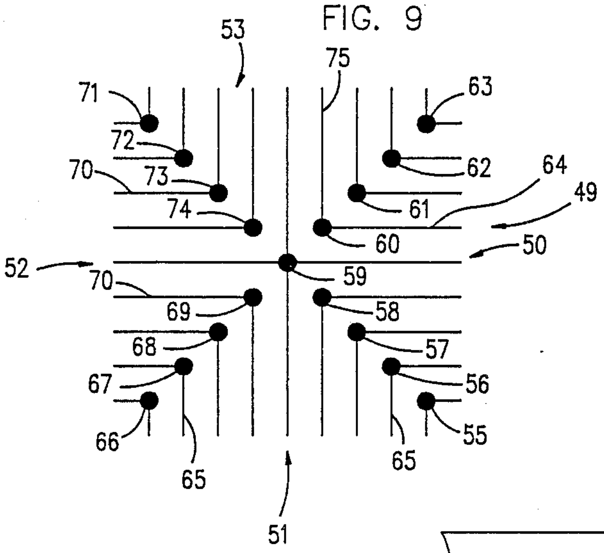
FIG. 9 is a schematic view showing still another arrangement for the electrodes and the electrical conductive means therebetween.

Referring to FIG. 9, there is shown a printhead 49 having four sets 50, 51, 52, and 53 of electrodes. The printhead 49 has four edge surfaces substantially perpendicular to adjacent edge surfaces so that each of the sets 50, 51, 52, and 53 of electrodes, which has the electrodes arranged in a column, may be disposed at the printing position.

The set 50 of electrodes in FIG. 9 is deemed to be at the printing position. Thus, 90° of rotation of the printhead 49 in either direction from the position of FIG. 9 disposes the set 51 or 53 of electrodes at the printing position. Rotation of 180° of the printhead 49 from the position of FIG. 9 positions the set 52 of electrodes at the printing position. Accordingly, there are four of the edge surfaces on the printhead 49 with each having one of the sets 50–53 of electrodes arranged in a column.

The set 50 of electrodes has each of its electrode connected to electrical contact pads 55–63 by separate electrical conductors 64. The set 51 of electrodes has its electrodes connected tothe electrical contact pads 55–59 by separate electrical conductors 65 and to electrical contact pads 66–69 by other of the separate electrical conductors 65. The contact pads 66–69 are aligned with the contact pads 59–63.

The set 52 of electrodes has some of its electrodes connected by separate electrical conductors 70 to the contact pads 59 and 66–69. The set 52 of electrodes has its other electrodes connected by other of the separate electrical conductors 70 to electrical contact pads 71–74. The contact pads 71–74 are aligned with the contact pads 55–59. The set of electrodes 53 has its electrodes connected by separate electrical conductors 75 to the electrical contact pads 59–63 and 71–74.

It should be understood that the separate conductors connected to the same electrical contact pad could be a single separate electrical conductor and are deemed to be a single separate electrical conductor even if two separate conductors. For example, the conductors 64 and 65 connected to the contact pad 55 constitute a single electrical conductor.

Figure 2:
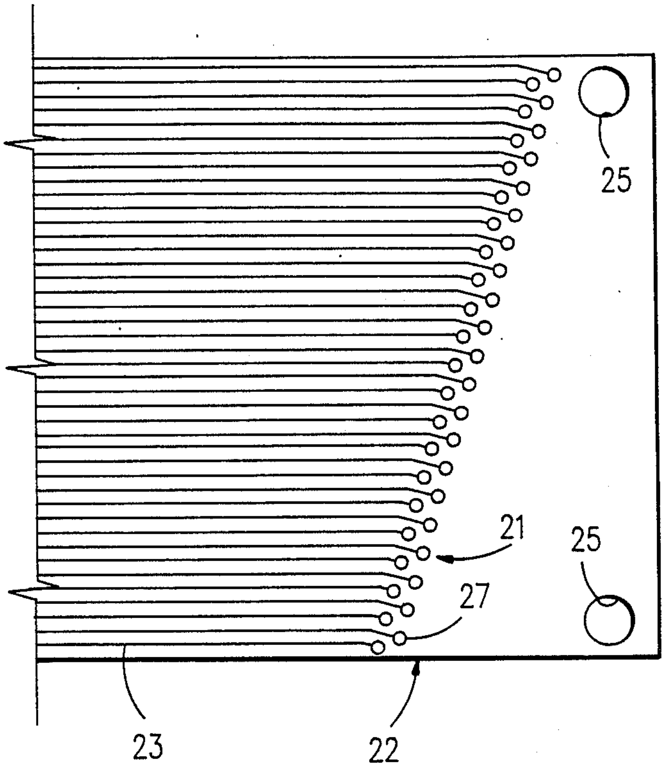
FIG. 2 is an enlarged plan view of a portion of a cable for supplying electrical signals from a printer to the electrodes of the printhead of FIG. 1.

A flattened cable 76 (see FIG. 10), which is similar to the cable 22 of FIG. 2, has electrical contact pads 77 arranged thereon in an L-shaped configuration so that the contact pads 77 will engage all of the contact pads of the specific set of electrodes at the printing position. For example, when the set 50 (see FIG. 9) of electrodes is at the printing position as shown in FIG. 9, the contact pads 77 (see FIG. 10) engage the electrical contact pads 55–63 (see FIG. 9).

When the set 51 of electrodes is at the printing position, the contact pads 77 (see FIG. 10) of the cable 76 engage the contact pads 55–59 (see FIG. 9) and 66–69. When the set 52 of electrodes is at the printing position, the contact pads 77 (see FIG. 10) of the cable 76 are connected with the contact pads 59 (see FIG. 9), 66–69, and 71–74. When the set 53 of electrodes is at the printing position, the contact pads 77 (see FIG. 10) of the cable 76 engage the contact pads 59–63 (see FIG. 9) and 71–74.

The arrangement of the contact pads 77 (see FIG. 10) is such that the lowermost electrode, for example, of the set of electrodes at the printing position will always engage the same contact pad 77 as will all the other of the contact pads connected to the electrodes of the set at the printing position. Thus, the same electrical signals are supplied to the same positioned electrode at the printing position for printing the same character irrespective of which of the sets 50, 51, 52, and 53 of electrodes is at the printing position.

Figure 10:
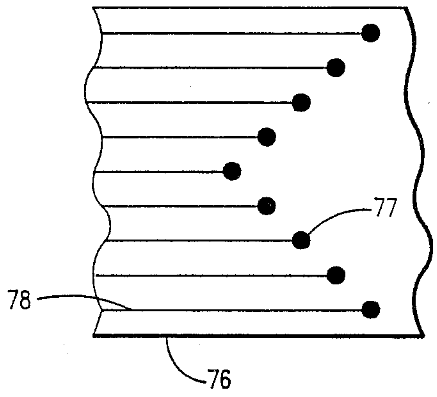
FIG. 10 is a schematic view of a portion of a cable for supplying electrical signals from a printer to the electrodes of the printhead of FIG. 9.

As shown in FIG. 10, each of the electrical contact pads 77 is connected to an electrical conductor 78 of the cable 76. The conductors 78 are connected to a printed circuit board (not shown) in the thermal printer 12 (see FIG. 4) to receive electrical signals for selectively energizing the electrodes of the set of electrodes at the printing position.

While FIG. 9 discloses each of the sets 50–53 of electrodes having only nine electrodes, this is for clarity purposes only. The number of electrodes could be forty-two, for example. If each of the sets 50–53 of electrodes has an even number of the electrodes rather than an odd number, then the contact pad 59 would be omitted or become a dummy. Likewise, the contact pad 77 (see FIG. 10) of the cable 76 corresponding to the contact pad 59 (see FIG. 9) would be omitted or become a dummy.

The previously available printheads such as the printhead of the aforesaid Horlander patent, for example, have not had the contact pads or the electrodes arranged symmetrically. The aforesaid Horlander patent has the contact pads in a horseshoe configuration. To use the symmetrical contact pad arrangement in FIGS. 1 and 2, for example, with a thermal printer already having its cable formed with the contact pad arrangement of the aforesaid Horlander patent, for example, so that the printhead 10 of the present invention may be used with already installed printers, the structure may be easily modified.

Figure 7:
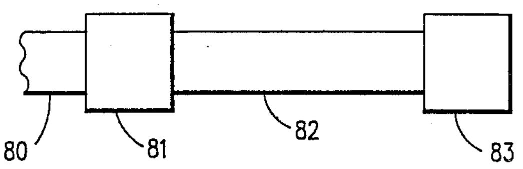
FIG. 7 is a schematic view of an arrangement for using the printhead of the present invention with a cable connector having a non-symmetrical electrical contact pad arrangement.

As shown in FIG. 7, a cable 80 extends from a printed circuit board of the thermal printer 12 (see FIG. 4) to supply electrical signals to non-symmetrically arranged electrical contact pads such as shown in the aforesaid Horlander patent, for example, of a terminal portion 81 (see FIG. 7) of the cable 80. Each of the contact pads of the terminal portion 81 of the cable 80 would be connected through separate electrical conductors in a cable 82 to electrical contact pads within a terminal portion 83 of the cable 82. The contact pads in the terminal portion 83 of the cable 82 would be arranged in the same configuration as the contact pads 21 in FIG. 2 when the printhead 10 (see FIG. 1) has the contact pads 20 arranged as shown in FIG. 1. When the first set 15 of electrodes and the second set 16 of electrodes are connected to other configurations of contact pads such as shown in FIGS. 5 and 6, for example, the contact pads of the terminal portion 83 of the cable 82 would be arranged for cooperation with such different symmetrical configuration.

Figure 8:
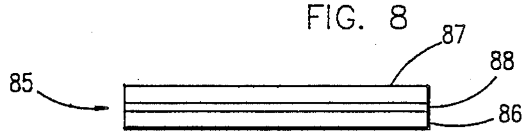
FIG. 8 is a schematic side elevational view of an adapter to enable use of the printhead of the present invention with a cable connector having a non-symmetrical electrical contact pad arrangement.

Referring to FIG. 8, there is shown an adapter 85 including a portion 86 of a cable (not shown) connected to the printed circuit board of the thermal printer 12 (see FIG. 4) to receive electrical signals thereover. Thus, the terminal portion 86 (see FIG. 8) would have a non-symmetrical configuration of contact pads such as shown in the aforesaid Horlander patent, for example.

A connector 87 would have the arrangement of the contact pads 21 (see FIG. 2) of the cable 22 when the first set 15 (see FIG. 1) of electrodes and the second set 16 of electrodes have the contact pads 20 arranged as shown in FIG. 1. To provide connection between the contact pads in the terminal portion 86 (see FIG. 8) and the connector 87, the adapter 85 has a multilayer circuitry 88 similar to semiconductor layers of an integrated circuit chip in which wires are electrically insulated from each other when crossing over each other to provide connections between the contact pads in the terminal portion 86 and the connector 87. The adapter 85 would be utilized in the assembly shown in the aforesaid Applegate et al patent, for example, in place of the flattened cable.

While the electrode connection scheme of the present invention has been described with respect to a resistive ribbon printer, it should be understood that it may be used with other types of thermal printers.

An advantage of this invention is that the life of a printhead of a resistive ribbon printer is substantially increased at relatively low cost. Another advantage of this invention is that the printhead may be used with a resistive ribbon printer designed for a printhead having a single set of electrodes.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A printhead having electrodes for use in a printer, said printhead including:

a body having a plurality of edge surfaces connected to each other to form its periphery;

said body having a set of said electrodes terminating at each of at least two of said edge surfaces in a single column;

said body having electrically conductive means connected to each of said sets of electrodes, said electrically conductive means receiving electrical information from a printer on which said printhead is installed to produce printing from said set of said electrodes at a printing position, only one of said sets of said electrodes being at the printing position at any time;

and said electrically conductive means being arranged so that the same positioned electrode of each of said sets of said electrodes when at the printing position receives the electrical information for the specifically positioned electrode.

2. The printhead according to claim 1 in which:

said plurality of said edge surfaces of said body includes a first edge surface and a second edge surface;

said sets of said electrodes include:

a first set of electrodes at said first edge surface;

and a second set of electrodes at said second edge surface;

and said first edge surface of said body and said second edge surface of said body are substantially parallel to each other so that rotation of said body through 180° causes one of said first and second sets of said electrodes to be removed from the printing position and the other of said first and second sets of said electrodes to be disposed at the printing position.

3. The printhead according to claim 2 in which said electrically conductive means includes:

a separate electrical conductor extending between each electrode of said first set of said electrodes and each electrode of said second set of said electrodes;

electrical connecting means to electrically connect each of said separate electrical conductors to separate electrical input means from a printer;

and said electrical connecting means being arranged so that the same positioned electrode of said first set of said electrodes and said second set of said electrodes when at the printing position is connected to the same of the separate electrical input means.

4. The printhead according to claim 3 in which each of said electrical connecting means is a contact pad connected to said separate electrical conductor.

5. The printhead according to claim 4 in which said contact pads are aligned at an angle to each of said first edge surface of said body and said second edge surface of said body.

6. The printhead according to claim 4 including in combination:

an adapter for connecting said contact pads of said printhead to electrical contact pads at the end of a first cable having a non-symmetrical arrangement;

said contact pads of said printhead having a symmetrical configuration;

said adapter including:

first means connected to each of the electrical contact pads at the end of the first cable;

second means having electrical contact pads arranged in the same symmetrical configuration as said contact pads of said printhead so that each of said contact pads of said printhead is connected to the appropriate electrical contact pad of said second means irrespective of said set of said electrodes that is at the printing position;

and each of said electrical contact pads of said second means being connected to said first means for connection to the appropriate electrical contact pad at the end of the first cable.

7. The combination according to claim 6 in which:

said first means is a second cable having separate electrical conductors connected to each of said contact pads of said second means and to the appropriate contact pad at the end of the first cable;

and said second means is a terminal portion of said second cable constituting said first means.

8. The combination according to claim 6 in which:

said first means is a multi-layer circuitry having separate electrically conductive means for connection to each of said contact pads of said second means and to the appropriate contact pad at the end of the first cable;

and said second means is a connector.

9. The printhead according to claim 1 in which said electrically conductive means includes:

a separate electrical conductor extending between an electrode of at least two of said sets of said electrodes;

electrical connecting means to connect each of said separate electrical conductors to separate electrical input means from a printer;

and said electrical connecting means being arranged so that the same positioned electrode of each of said sets of said electrodes when at the printing position is connected to the same of the separate electrical input means.

10. The printhead according to claim 9 in which each of said electrical connecting means is a contact pad connected to said separate electrical conductor.

11. The printhead according to claim 10 including in combination:

an adapter for connecting said contact pads of said printhead to electrical contact pads at the end of a first cable having a non-symmetrical arrangement;

said contact pads of said printhead having a symmetrical configuration;

said adapter including:

first means connected to each of the electrical contact pads at the end of the first cable;

second means having electrical contact pads arranged in the same symmetrical configuration as said contact pads of said printhead so that each of said contact pads of said printhead is connected to the appropriate electrical contact pad of said second means irrespective of said set of said electrodes that is at the printing position;

and each of said electrical contact pads of said second means being connected to said first means for connection to the appropriate electrical contact pad at the end of the first cable.

12. The combination according to claim 11 in which:

said first means is a second cable having separate electrical conductors connected to each of said contact pads of said second means and to the appropriate contact pad at the end of the first cable;

and said second means is a terminal portion of said second cable constituting said first means.

13. The combination according to claim 11 in which:

said first means is a multi-layer circuitry having separate electrical conductive means for connection to each of said contact pads of said second means and to the appropriate contact pad at the end of the first cable;

and said second means is a connector.

* * * * *